(12) United States Patent
Yang et al.

(10) Patent No.: US 6,305,154 B1
(45) Date of Patent: Oct. 23, 2001

(54) HIGH SPEED SICKLE CUTTING SYSTEM

(75) Inventors: Xinzham Yang, Indianola; Max R. Bloom, St. Charles; Gail I. Schwenke, Indianola, all of IA (US)

(73) Assignee: Alamo Group Inc., Seguin, TX (US)

( * ) Notice: Subject to any disclaimer, the term of this patent is extended or adjusted under 35 U.S.C. 154(b) by 0 days.

(21) Appl. No.: 09/416,110

(22) Filed: Oct. 8, 1999

Related U.S. Application Data

(60) Provisional application No. 60/126,848, filed on Mar. 30, 1999.

(51) Int. Cl.$^7$ .................................................. A01D 34/13
(52) U.S. Cl. ............................... 56/298; 59/299; 59/307; 59/296
(58) Field of Search ............................. 56/289, 293, 296, 56/298, 299, 307, 308, 309, 310, 311

(56) References Cited

U.S. PATENT DOCUMENTS

| Re. 450 | * | 4/1857 | Hussey | 56/299 |
|---|---|---|---|---|
| 513,834 | * | 1/1894 | Smith | 56/299 |
| 2,590,788 | | 3/1952 | Novak . | |
| 2,619,787 | * | 12/1952 | Mills et al. | 56/310 |
| 2,994,176 | * | 8/1961 | Stroburg et al. | 56/298 |
| 3,199,279 | | 8/1965 | Yerke . | |
| 3,431,714 | | 3/1969 | Bouet . | |
| 3,698,171 | * | 10/1972 | Hecht | 56/331 |
| 4,070,810 | * | 1/1978 | Brakke | 56/291 |
| 4,519,192 | | 5/1985 | Oppenhuisen et al. . | |
| 4,651,511 | | 3/1987 | Majkzrak . | |
| 4,702,064 | * | 10/1987 | Hunter et al. | 56/310 |
| 4,750,321 | * | 6/1988 | Klein | 56/310 |
| 4,854,114 | * | 8/1989 | Speck | 56/296 |
| 5,694,754 | * | 12/1997 | Shuknecht et al. | 56/298 |
| 5,989,152 | * | 11/1999 | McCredie | 56/298 |

* cited by examiner

*Primary Examiner*—Robert E. Pezzuto
*Assistant Examiner*—Nathan Mammen
(74) *Attorney, Agent, or Firm*—Gunn, Lee & Keeling; Michelle Evans

(57) ABSTRACT

A sickle cutting system of the type used in mowers, other harvesting machines and the like. A sickle is shown consisting of 1¾ to 2¼ inch knife sections, a knifeback bar, a plurality of sickle guards with fingers spaced to match the knife sections. The knife and sickle guard fingers may be of any number. The sickle cutting system provides a cutting surface for the sickle, adjustable hold-down clips that hold the knife sections down to the cutting surface. The clips also provide a rear wear bar for the sickle. A driving mechanism is provided with a stroke complimentary to the spacing of the knife sections. The driving mechanism may be a wobble joint, a pitman type, or other device which can convert rotary motion to reciprocating motion. The sickle is driven at a speed of between 2200 to 2700, and ideally at approximately 2475 strokes per minute.

13 Claims, 5 Drawing Sheets

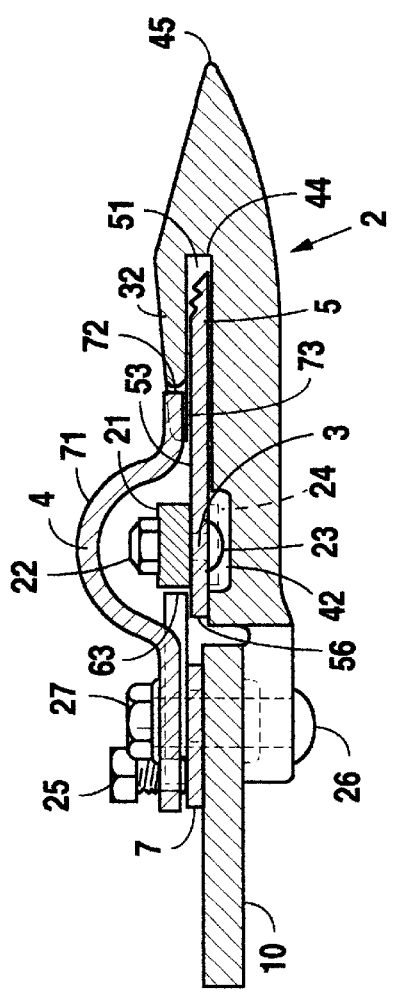
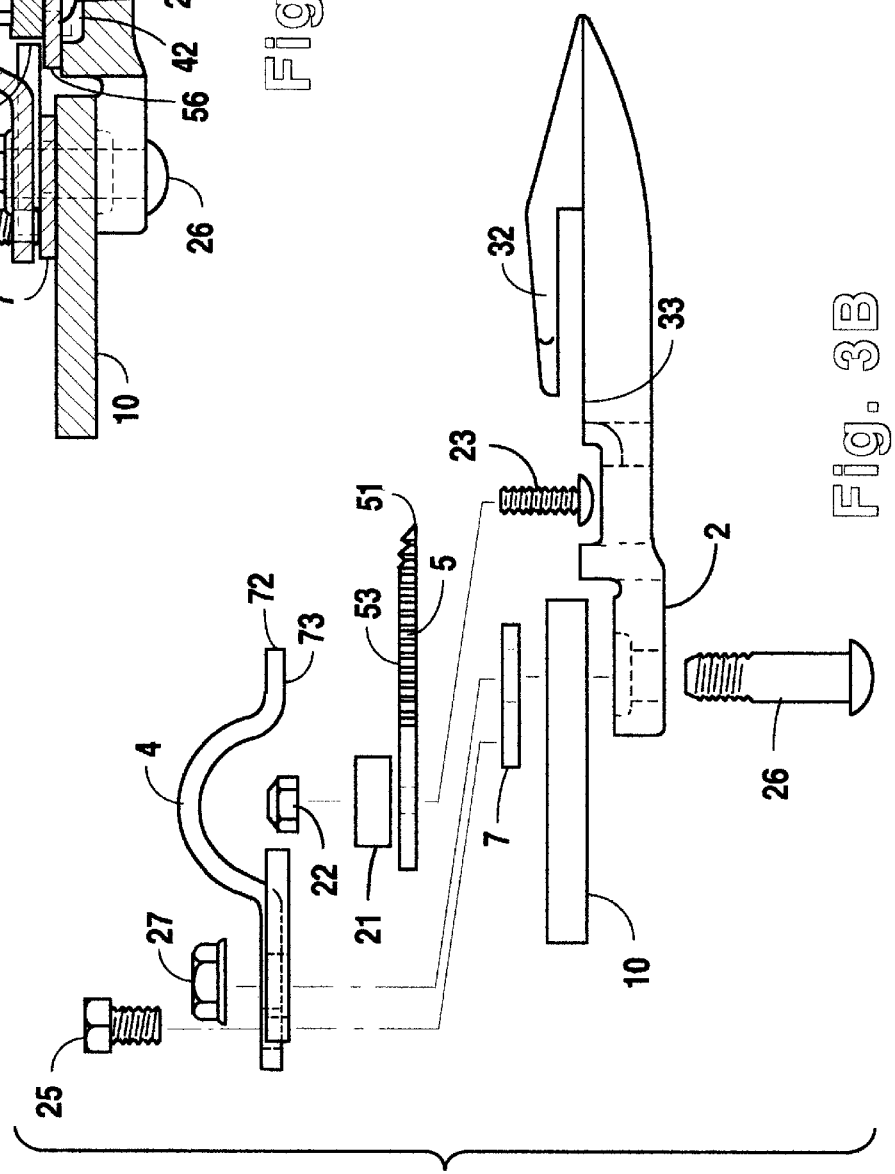
Fig. 3A
Fig. 3B

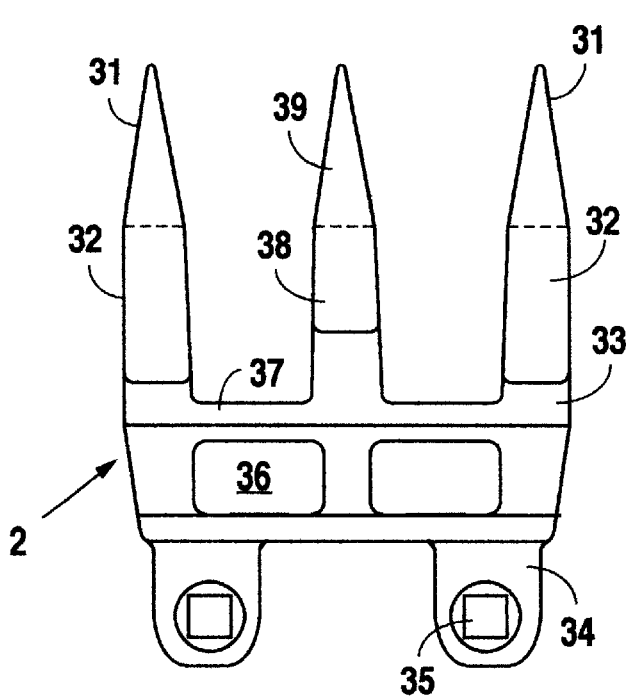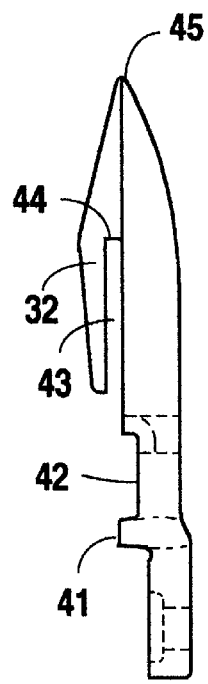
Fig. 4                     Fig. 5
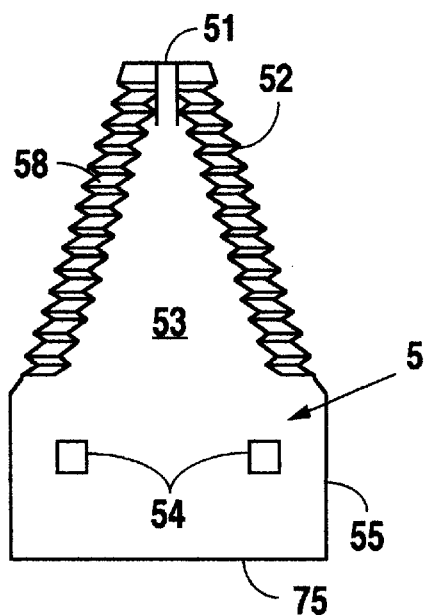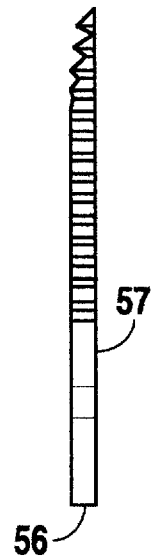
Fig. 6A                    Fig. 6B

HIGH SPEED SICKLE CUTTING SYSTEM

Applicant claims priority under 35 U.S.C. §119 of U.S. Provisional Application Ser. No. 60/126,848 filed Mar. 30, 1999.

BACKGROUND OF THE INVENTION

1. Field of the Invention

The present invention relates to sickle bar mowers and crop-harvesting machine systems and more particularly, to a new cutting system designed and proven to improve cutting efficiency, speed, and quality. The new cutting system utilizes knife sections spaced less than three inches apart which reciprocate at approximately 2475 strokes per minute. The present invention provides a superior cutting efficiency and a higher maximum effective speed as compared to the sickle bar mower or crop harvesting machine of the prior art.

2. Description of the Related Art

The standard or conventional sickle bar mower or crop-harvesting machine provides a sickle bar cutting system which further consists of a sickle with three-inch wide knife sections. The knife sections are placed adjacent to one another and three inches apart, as measured from one knife tip to the next, on a reciprocating sickle bar. Two-prong sickle guards are mounted to a stationary support bar located adjacent to the reciprocating sickle bar of the system. Stationary knife hold-down clips are also provided on the support bar. A driving mechanism that provides a three-inch reciprocating motion to the reciprocating sickle bar is also provided. Typically, the driving mechanism moves the sickle bar in a reciprocating motion at a speed of approximately 1,650 strokes per minute. Each knife section attached to the sickle bar moves between the stationary sickle guards which are overlaying the adjacent sickle bar and knife sections. The movement of the knife sections within overlaying sickle guards creates a shearing action. The sickle guards provide the base for the shearing action and also support and protect the sickle bar and knife sections as the sickle bar strokes.

The standard knife velocity averages approximately 4.7 miles per hour and the maximum knife velocity is approximately 7.5 miles per hour. However, the standard sickle cutting system allows mowers, crop-harvesting machines, and the like to operate effectively at a maximum ground speed of approximately 4.5 to 5 miles per hour. The standard system can increase its maximum ground speed to approximately 8 miles per hour. However, the standard system cannot operate effectively at such a speed.

The sickle may be driven through a pitman rod attached to the sickle head by means of a ball-and-socket joint. Alternatively, a wobble-joint drive or hydraulic or pneumatic reciprocation means may be used to transform rotary motion to reciprocating motion in order to drive the sickle.

The standard sickle cutting system has limitations. The three-inch stroke between sickle guards limits the travel speed of the machine. That is, if the ground speed of the cutting system exceeds the speed of the blade's reciprocation, crops being harvested will be pushed forward to a large degree before they are cut. This is due to the an accumulation of crop material between sickle guards which is occurring at a rate faster than the rate of cutting. From one sickle guard, the knife sections of the standard sickle cutting system must travel a distance of three inches before reaching an adjacent sickle guard and cutting crop material there against. Therefore, where the typical cutting system is operated at sufficiently high speeds, the end result is an accumulation of crop material between sickle guards prior to cutting which further results in a mashing and shattering the grain heads. Thus a significant portion of the crop may be lost when harvesting grains at sufficiently high speeds with the typical cutting system of the prior art.

Attempts have been made to improve the current sickle cutting system. U.S. Pat. No. 4,651,511 to Majkrzak employs a modified sickle guard system. The sickle guards come in two forms, long and short. The sickle guard fingers alternate between the long and the short variety on the sickle bar. The long sickle guard fingers, sized akin to other guard fingers of the prior art, are spaced three inches apart from one another while the shorter guard fingers are spaced there between. This leaves approximately one and one half inches of space between the short and long alternating sickle guards. While this does reduce the travel distance necessary for a knife section to cut crop material against adjacent guards, the one and a half inch spacing tends to reduce cutting effectiveness. Again, the rate of reciprocation and the short guard fingers fail to prevent crop accumulation. As a result crop stems continue to accumulate and are pushed forward to a large degree before cutting occurs. Additionally, plugging problems occur with heavy, dense, or vineal material such as large weeds or corn stalks.

The present invention is a new sickle cutting system that enables mowers, crop harvesters, and the like to cut hay, grain, and other crops more efficiently with respect to time and production. The invention provides a considerable reduction in grain loss. Stems are cut more cleanly rather than in aggregate which lessens shock to the crop. Further, if any shattering of grains does occur, the grains are likely to fall onto the combine head due to a higher possible ground speed of the cutting system.

SUMMARY OF THE INVENTION

The present invention is an improvement in sickle bar mower cutting systems of the types used in agricultural harvesting and mowing equipment. Ideally, this unique system comprises a sickle having knife sections uniformly spaced approximately two-inches from one another, as measured from their tips, on a knifeback bar. The knife sections may be smooth or serrated. A plurality of knife guards have sickle guard fingers thereon which are spaced at approximately two-inches from one another and match the spacing of the knife sections. The knife sections and guard fingers may be of any number. The knife guards are mounted to the support bar of a mower, crop harvesting machine, or the like. The sickle guard fingers of the knife guards provide a cutting surface for the sickle during its horizontal reciprocation. Adjustable hold-down clips enclose the knife sections within guard fingers and against the cutting surfaces thereof. The clips also provide a rear wear bar for the knifeback bar. Ideally, the high speed sickle system has, but is not limited to, a two-inch stroke driving mechanism that coverts rotary motion to reciprocating motion and drives the sickle at a speed of approximately 2475±10% stokes per minute (spm). The drive mechanism may be a wobble box, a pitman type, or other device including hydraulic and pneumatic reciprocating mechanisms that would provide the specified length and speed of stroke.

With a two-inch stroke ±10% and a speed of 2475±10% spm, this unique sickle cutting system has the same knife lateral speed as the standard three-inch sickle system. The knife sections travel two inches in one direction and cut the crops against a guard finger and then travel back and cut the crops against the adjacent guard finger. Rather than traveling three inches in one direction to cut crops against a guard finger, the knife sections need only travel a maximum of two inches. This enables mowers, crop harvesting machines, and the like to travel forward at a ground speed approximately 50% faster than standard systems while at the same time reducing crop stem accumulation by approximately 33%. It also results in more uniform, easier, and more efficient crop cutting. Further, the two-inch spacing allows a three-prong guard to fit existing standard cutter bars utilizing three inch spacing without modification thereof. That is, the standard guard having two fingers is simply replaced with a guard having three fingers.

This newly-designed, high-speed sickle cutting system has been tested under field conditions with different field crops and may be adapted to all known uses of sickle bar mowers used for cutting field crops and harvesting grain.

Table 1 shows the primary technical features of the high-speed sickle cutting system and a comparison to the standard or conventional three-inch sickle system.

TABLE 1

Primary Technical Information of the Sickle Cutting Systems

| FEATURE | HIGH-SPEED | CONVENTIONAL |
|---|---|---|
| Sickle Knife | *Two inch section | Three inch section |
| Sickle Guard | *Two inch spaced fingers | Three inch spaced fingers |
| Hold-Down Clip | Adjustable | Variable |
| Stroke Length | *Two Inch | Three Inch |
| Sickle Speed (spm) | *approximately 2475 (spm) | approximately 1650 (spm) |
| Peak Sickle Speed (mph) | approximately 7.4 (mph) | approximately 7.4 (mph) |
| Avg. Sickle Speed (mph) | approximately 4.7 (mph) | approximately 4.7 (mph) |
| Avg. Operating Speed (mph) | approximately 7 (mph) | approximately 4.5 (mph) |

*Two-inches is the embodiment of the design as tested. However, a range of different conditions may apply, including spacing of 1-3/4" to 2-1/4" (approximately 2" ± 10%) and sickle stroke speed 2200–2700 spm (approximately 2475 spm ± 10%).

*Two-inches is the embodiment of the design as tested. However, a range of different conditions may apply, including spacing of 1¾" to 2¼" (approximately 2"±10%) and sickle stroke speed 2200–2700 spm (approximately 2475 spm±10%).

BRIEF DESCRIPTION OF THE DRAWINGS

FIG. 3a is a cross-sectional view of a segment of the sickle cutting system of the present invention.

FIG. 3b is a side separation view of a segment of the sickle cutting system of the present invention.

FIG. 4 is a top view of a two-inch spaced three-prong sickle guard.

FIG. 5 is a side view of the three-prong sickle guard with two-inch spacing.

FIGS. 6a and 6b are the top and side views of serrated knife sections of the system.

DESCRIPTION OF THE PREFERRED EMBODIMENT

Figure 1:
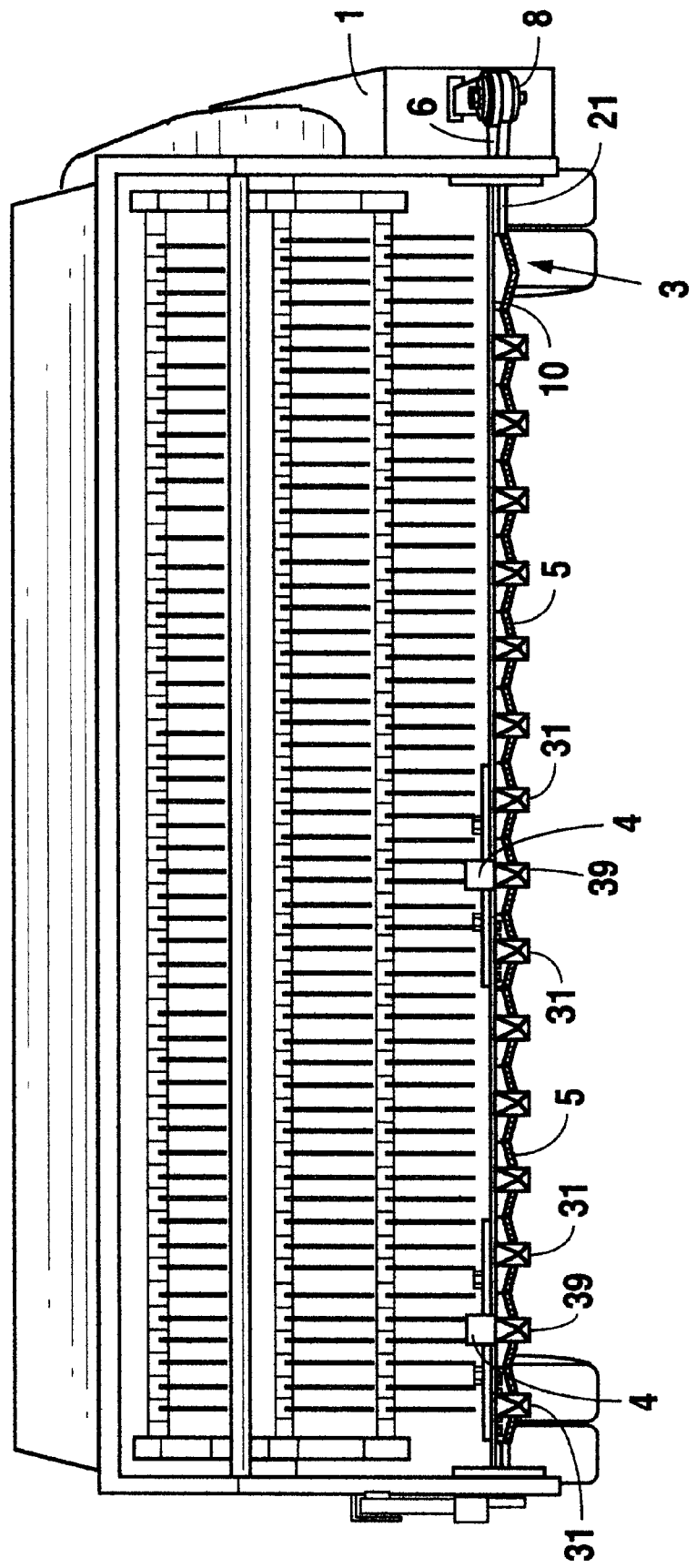
FIG. 1 is a perspective view of a sickle bar mower utilizing the sickle cutting system of the present invention.

Referring to FIG. 1, a sickle bar mower utilizing the sickle cutting system of the present invention is shown. The sickle bar mower is specially adept at cutting crops, including heavy, dense, or vineal material such as large weeds or corn stalks, at high ground speeds. The mower is shown with the sickle cutting system of the present invention including the sickle (3) its guard fingers (31, 39), sickle knife sections (5), and support bar (10).

Figure 2:
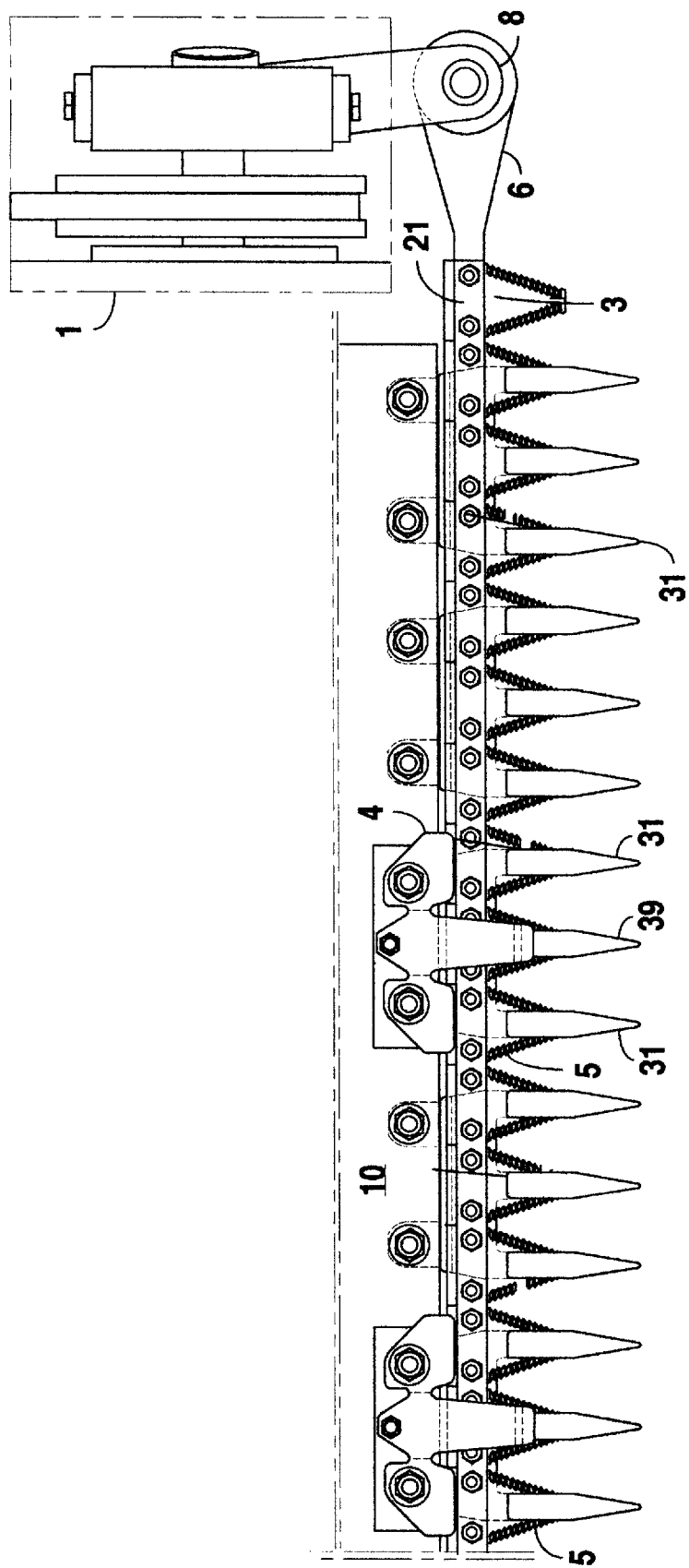
FIG. 2 is a top view of the unique sickle cutting system of the present invention.

Referring to FIG. 2, a top view of the new sickle cutting system is shown. A sickle drive mechanism (1), such as a wobble joint or a pitman drive, is provided having a connecting rod (8). A sickle (3) is provided comprised of knife sections (5) and a knifeback bar (21) which is driven by the connecting rod (8) through its sickle head (6) which receives the connecting rod (8). The connecting rod (8) is thereby able to provide a two-inch stroke reciprocating motion to the sickle (3) at a speed of approximately 2475 strokes per minute.

The knife sections (5) approach two-inches in width at their base (75) (See FIG. 6A). The sickle knife sections (5) move back and forth and cut against the cutting surfaces (33) of the guard fingers (31, 39) of the sickle guards (2) (See FIG. 4). The guard fingers (31, 39) are arranged in groups of three on the sickle guards (2) (See FIGS. 3A, 3B). The guard fingers (31, 39) have two-inch spacing there between. The sickle guards (2) are mounted onto a support bar (10) of the sickle bar mower (See FIGS. 3A, 3B). An adjustable hold-down clip (4) with appropriate spacers (7) is installed on every other sickle guard (2) to maintain the correct cutting clearance between knife sections (5) and cutting surfaces (33) of the sickle guards (2) (See FIGS. 3A, 3B).

Referring to FIGS. 3A and 3B, cross-sectional and side separation views of the sickle cutting system are shown. The sickle guards (2) are secured to the support bar (10) of the mower with carriage bolts (26) and flanged locknuts (27). The adjustable hold-down clip (4) is mounted to the support bar (10) with the same carriage bolt (26) and locknut (27) used for mounting the sickle guard (2) to the support bar (10). An appropriate spacer (7) is secured between the hold-down clip (4) and the support bar (10) for the desired range of adjustment there between. An adjusting bolt with locking means (25) is threaded through the hold-down clip (4) and can be turned up or down against the spacer (7) so that clearance between the hold-down surface (73) of the hold-down clip (4) and the top surface (53) of the knife section (5) may be adjusted to the desired clearance there between. Each knife section (5) is bolted to the knifeback bar (21) with a second carriage bolt (23) and second locknut (22) or other appropriate fasteners.

Referring specifically to FIG. 3A, the knifeback bar (21) runs underneath an arc (71) of the hold-down clip (4) and against a wear bar (63) of the hold-down clip (4) when the sickle (3) is pushed backward by the crops. The sickle knife sections (5) run against the cutting surface (33) of the sickle guards (2) so that a shearing action to the crops is provided (See FIG. 3B). A retaining splice bar (24) is bolted to the knife sections (5) and the knifeback bar (21) using special bolts and locknuts or similar fasteners (not shown) at various locations inside a groove (42) of the sickle guards (2). The retaining splice bar (24) keeps the cutting tip (51) of the knife section (5) from moving forward and contacting the nose (44) of the guard (2).

Referring to FIGS. 4 and 5, a top view and a side view of the sickle guard (2) is shown with two-inch spacing between three sickle guard fingers (31, 39) attached thereto. The upper surface (34) and square holes (35) are for mounting the sickle guard (2) to the support bar (10) of a mower (See FIGS. 3A and 3B). The three sickle guard fingers (31, 39) have rearward facing slots (43) with cutting surfaces (33) at the bottom thereof. Lips (32,38) are at the top of each rearward facing slot (43). The center sickle guard finger (39) has a center lip (38) whereas outer lips (32) are provided in conjunction with the remaining guard fingers (31). The center lip (38) is shorter than the outer lips (32) so that the hold-down clip (4) can be applied above the sickle (3) at this location (See FIG. 3A). The lips (32, 38) support the crop when sickle knife is cutting against the cutting surfaces (33).

The guard fingers (31, 39) are pointed at the finger tips (45) so that they divide the crop and direct the stems between guard fingers (31, 39) rather than pushing the crop forward. The cutting surfaces (33) are leveled with a wear bar (63) which also serves to enclose a groove (42). The groove (42) keeps the retaining splice bar (24) from moving forward which could allow the cutting tip (51) of the knife section (5) to touch the nose (44) of the guard (2) (See FIG. 3A). Additionally, a trash bar (37) keeps crop debris from becoming lodged within inter-workings of the mower by providing rectangular holes (36) which allow debris to drop through the sickle bar system and onto the ground. Referring to FIGS. 6A and 6B, top and side views of the two-inch wide knife section (5) are shown. The knife section (5) has square mounting holes (54) that provide easier and more secure fastening. The knife sections (5) are mounted to the sickle (3) and uniformly-spaced with each side (55) being snug but not tight against an adjacent side (55) of an adjacent section (not shown). These two-inch knife sections (5) have two cutting edges (58) a piece. The cutting edges (58) may have between 7 and 14 teeth (52) per inch, as measured parallel to the heel (56) of the knife section (5). Alternatively, the cutting edges (58) may be smooth for some applications. Both cutting edges (58) have an angle of approximately 19 degrees±20% with reference to the sides (55) of the knife section (5). When installed, the cutting tip (51) will have clearance from the nose (44) of the sickle guard (2) and the heel (56) will have clearance from the support bar (10) of the mower (See FIG. 3A). The top surface (53) may be secured as desired by a hold-down clip (4) so that the bottom surface (57) will run against the cutting surface (33) of the sickle guard (2) (See FIG. 3A).

Figure 7:
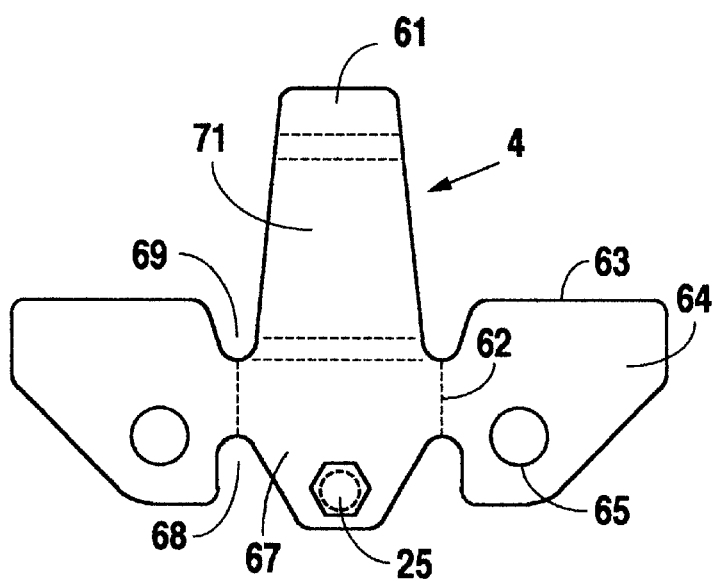
FIG. 7 is a top view of the adjustable hold-down clip.
Figure 8:
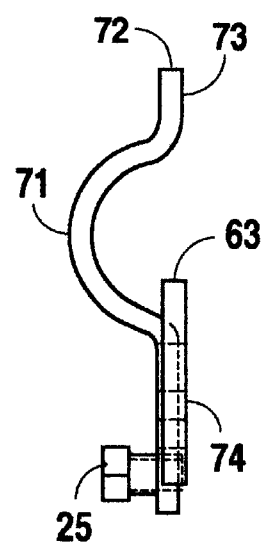
FIG. 8 is a side view of the adjustable hold-down clip.

Referring to FIGS. 7 and 8, a top view and a side view of the hold-down clip (4) are shown. The hold-down clips (4) are mounted through circular holes (65) in mounting plates (64) onto the support bar (10) of the mower using the same carriage bolt (26) and flanged lock nut (27) used to mount the sickle guard (2) to the support bar (10) (See FIG. 3B). Between a mounting surface (74) and the support bar (10) there may be a spacer (7) to provide appropriate thickness (See FIG. 3B). The up and down movement of the forward end (61) of the hold-down clip (4), which occurs as the adjusting bolt with locking means (25) is turned, will give an adjustable setting for the clearance between the hold-down surface (73) of the hold down clip (4) and the top surface (53) of the knife section (5) (See FIG. 3A). The wear bar (63), which the knifeback bar (21) of the sickle (3) runs against, provides a wearing and positioning surface (See FIG. 3A). The arc (71) is over the knifeback bar (21) and the flanged lock nuts (27) and carriage bolts (26) for the knife sections (5) (See FIG. 3A). The terminal end (72) of the hold-down clip (4) is next to, but clear of, the lip (38) of the center finger (39) of the sickle guard (2) (See FIG. 3A).

There are various sickle bar systems which precede the present invention. However, none is capable of the efficiency and overall rate of cutting of the present invention. This is due to the combination of the size and spacing of the invention's parts in conjunction with the rate of reciprocation of the sickle (3) among other features.

Various modifications of the preferred design may be made and remain within the scope of the design. For example, the holes for fasteners, the length, type, number, and quantity of the fasteners, the reciprocating mechanism, and the like may be of interchangeable types. The length, width, shape, spacings, and speeds of components may be varied. Such modifications are contemplated as being within the scope of claimed coverage and respective equivalents.

What is claimed is:

1. A high speed sickle cutting system for a sickle bar mower comprising:

a plurality of knife sections having cutting tips with less than three inches of distance there between, said plurality of knife sections further comprising individual knife sections with bases secured to a knifeback bar and having cutting tips;

a plurality of sickle guard fingers having finger tips with less than three inches of distance there between;

holes within said plurality of sickle guard fingers for securing said plurality of sickle guard fingers to a support bar;

individual sickle guard fingers comprising said plurality of sickle guard fingers, said individual sickle guard fingers resting adjacent and parallel to said individual knife sections, said support bar being adjacent to and separate from said knifeback bar;

a sickle drive mechanism having a connecting rod with a sickle head attached to said knifeback bar, said sickle drive mechanism capable of reciprocating said knifeback bar with a stroke of less than three inches and compatible with said plurality of knife sections and said plurality of sickle guard fingers;

a hold down clip attached to said support bar opposite an individual sickle guard finger and adjacent to an individual knife section;

a triad of individual sickle guard fingers comprising said plurality of sickle guard fingers, said triad of individual sickle guard fingers further comprising a center individual sickle guard finger, a left individual sickle guard finger, and a right individual sickle guard finger;

a center rearward facing slot of said center individual sickle guard finger working in conjunction with said hold down clip to enable enclosure of a majority of said individual knife section therein;

a center lip extending inward to form said center rearward facing slot of said center individual sickle guard finger;

a left lip extending inward to form a left rearward facing slot of said left individual sickle guard finger, and a right lip extending inward to form a right rearward facing slot of said right individual sickle guard finger, said center lip being smaller than said right lip and said left lip, said center rearward facing slot being smaller than said right rearward facing slot and said left rearward facing slot, said center lip and said center rearward facing slot accommodating said hold down clip.

2. The high speed sickle cutting system for a sickle bar mower of claim 1, wherein said hold down clip is equipped with a hold down surface adjacent to and separate from a top surface of said individual knife section, said hold down clip being adjustable with respect to said hold down surface in relation to said top surface for providing a desired clearance there between.

3. The high speed sickle cutting system for a sickle bar mower of claim 2, comprising:

a groove within said individual sickle guard finger for accommodating a splice bar attached to and underlying said individual knife section, said groove terminating rearwardly in the form of a closing bar, said closing bar supporting said knife section rearward of said splice bar;

said hold down clip having arc for clearance over said knifeback bar, and a spacer underlying said hold down clip to help provide adequate clearance between said hold down surface and said top surface.

4. The high speed sickle cutting system for a sickle bar mower of claim 3, wherein said hold down clip further comprises a rear wear bar, said rear wear bar capable of contacting said knifeback bar to help prevent excess rearward movement of said individual knife section, said splice bar and said groove capable of contacting one another forwardly and rearwardly and acting in concert to prevent excess rearward and forward movement of said individual knife section.

5. The high speed sickle cutting system for a sickle bar mower of claim 1 wherein said triad of individual sickle guard fingers is equipped with a trash bar adjacent to said support bar, said trash bar further comprising holes to allow debris to pass through said high speed sickle cutting system without disrupting any inter-working parts thereof.

6. The high speed sickle cutting system for a sickle bar mower of claim 1, further comprising;

cutting edges of an individual knife section opposite one another, and cutting surfaces opposite one another and accompanied by a lip on an individual sickle guard finger, said lip capable of supporting crops and allowing said cutting edges and said cutting surfaces to act in conjunction to cut said crops when said knifeback bar is reciprocating.

7. The high speed sickle cutting system for a sickle bar mower of claim 6, wherein said cutting edges originate at one of said bases and approach one another at an angle of between 15° and 23° eventually terminating in one of said cutting tips.

8. The high speed sickle cutting system for a sickle bar mower of claim 6, wherein said cutting edges are non-serrated.

9. The high speed sickle cutting system for a sickle bar mower of claim 6, wherein said cutting edges are serrated with teeth.

10. The high speed sickle cutting system for a sickle bar mower of claim 9, wherein a base terminates at a heel running parallel to said knifeback bar, said teeth being between seven and fourteen in number per inch as measured parallel to said heel.

11. The high speed sickle cutting system for a sickle bar mower of claim 1 wherein the distance between said finger tips is between 1.75 inches and 2.25 inches.

12. The high speed sickle cutting system for a sickle bar mower of claim 1 wherein said sickle driving mechanism provides a stroke of between 1.75 inches and 2.25 inches.

13. A method of operating a high speed sickle cutting system for a sickle bar mower comprising:

providing a plurality of knife sections having cutting tips with less than three inches of distance there between, said plurality of knife sections further comprising individual knife sections with bases secured to a knifeback bar and having cutting tips;

locating a plurality of sickle guard fingers having finger tips with less than three inches of distance there between on a support bar by way of holes within said plurality of sickle guard fingers for securing said plurality of sickle guard fingers to a support bar, said plurality of sickle guard fingers further comprising individual sickle guard fingers, said individual sickle guard fingers resting adjacent and parallel to said individual knife sections, said support bar being adjacent to and separate from said knifeback bar, and a hold down clip attached to said support bar opposite said individual sickle guard finger and adjacent said individual knife section;

further locating a triad of individual sickle guard fingers comprising said plurality of sickle guard fingers, said triad of individual sickle guard fingers further comprising a center individual sickle guard finger, a left individual sickle guard finger, and a right individual sickle guard finger; a center rearward facing slot of said center individual sickle guard finger working in conjunction with said hold down clip to enable enclosure of a majority of said individual knife sections therein; a center lip extending inward to form said center rearward facing slot of said center individual sickle guard finger; a left lip extending inward to form a left rearward facing slot of said left individual sickle guard finger; and a right lip extending inward to form a right rearward facing slot of said right individual sickle guard finger, said center lip being smaller than said right lip and said left lip, said center rearward facing slot being smaller than said right rearward facing slot and said left rearward facing slot, said center lip and said center rearward facing slot accommodating said hold down clip; and reciprocating a sickle drive mechanism having a connecting rod with a sickle head attached to said knifeback bar, said sickle drive mechanism directly reciprocating said knifeback bar with a stroke of less than three inches and compatible with said plurality of knife sections and said plurality of sickle guard fingers.

* * * * *